(12) United States Patent
Simpson et al.

(10) Patent No.: US 12,277,925 B2
(45) Date of Patent: Apr. 15, 2025

(54) AUTOMATIC AUDIO PLAYBACK OF DISPLAYED TEXTUAL CONTENT

(71) Applicant: Google LLC, Mountain View, CA (US)

(72) Inventors: Rachel Ilan Simpson, London (GB); Benedict Davies, London (GB); Guillaume Boniface-Chang, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/535,279

(22) Filed: Dec. 11, 2023

(65) Prior Publication Data

US 2024/0127792 A1    Apr. 18, 2024

Related U.S. Application Data

(63) Continuation of application No. 17/052,046, filed as application No. PCT/US2019/061401 on Nov. 14, 2019, now Pat. No. 11,887,581.

(51) Int. Cl.
  G06F 3/0485  (2022.01)
  G10L 13/02   (2013.01)
  G10L 13/08   (2013.01)

(52) U.S. Cl.
  CPC ........... *G10L 13/08* (2013.01); *G06F 3/0485* (2013.01); *G10L 13/02* (2013.01)

(58) Field of Classification Search
  None
  See application file for complete search history.

(56) References Cited

U.S. PATENT DOCUMENTS

| | | |
|---|---|---|
| 5,850,629 A | 12/1998 | Holm et al. |
| 6,324,511 B1 | 11/2001 | Kiraly et al. |
| 9,772,816 B1 | 9/2017 | Bigham et al. |
| 9,927,957 B1 | 3/2018 | Sagar |
| 2011/0184738 A1 | 7/2011 | Kalisky et al. |
| 2015/0339049 A1 | 11/2015 | Kasemset et al. |
| 2015/0347084 A1 | 12/2015 | Cameron et al. |

(Continued)

FOREIGN PATENT DOCUMENTS

| | | |
|---|---|---|
| CN | 104299631 | 1/2015 |
| JP | 2012/185323 | 9/2012 |

(Continued)

OTHER PUBLICATIONS

International Search Report and Written Opinion for Application No. PCT/US2019/061401, mailed on Jul. 22, 2020, 11 pages.

*Primary Examiner* — Jakieda R Jackson
(74) *Attorney, Agent, or Firm* — DORITY & MANNING P.A.

(57) ABSTRACT

An audio playback system that provides intuitive audio playback of textual content responsive to user input actions, such as scrolling portions of textual content on a display. Playback of audio (e.g., text-to-speech audio) that includes textual content can begin based on a portion of textual content being positioned by a user input at a certain position on a device display. As one example, a user can simply scroll through a webpage or other content item to cause a text-to-speech system to perform audio playback of textual content displayed in one or more playback section(s) of the device's viewport (e.g., rather than requiring the user to perform additional tapping or gesturing to specifically select a certain portion of textual content).

20 Claims, 9 Drawing Sheets

(56) References Cited

U.S. PATENT DOCUMENTS

| | | |
|---|---|---|
| 2016/0077795 A1 | 3/2016 | Cha et al. |
| 2017/0289717 A1 | 10/2017 | Little |
| 2019/0087500 A1 | 3/2019 | Danyluk et al. |
| 2021/0099405 A1 | 4/2021 | Al Majid et al. |

FOREIGN PATENT DOCUMENTS

| | | |
|---|---|---|
| JP | 2013/125372 | 6/2013 |
| JP | 2012/133662 | 12/2014 |
| JP | 2014/222542 | 9/2015 |
| JP | 2018/072509 | 5/2018 |
| JP | 2019/185470 | 10/2019 |
| KR | 2006/0094599 | 8/2006 |
| KR | 2011/0131014 | 12/2011 |
| KR | 2019/0098932 | 8/2019 |
| WO | WO 2006/008871 | 1/2006 |

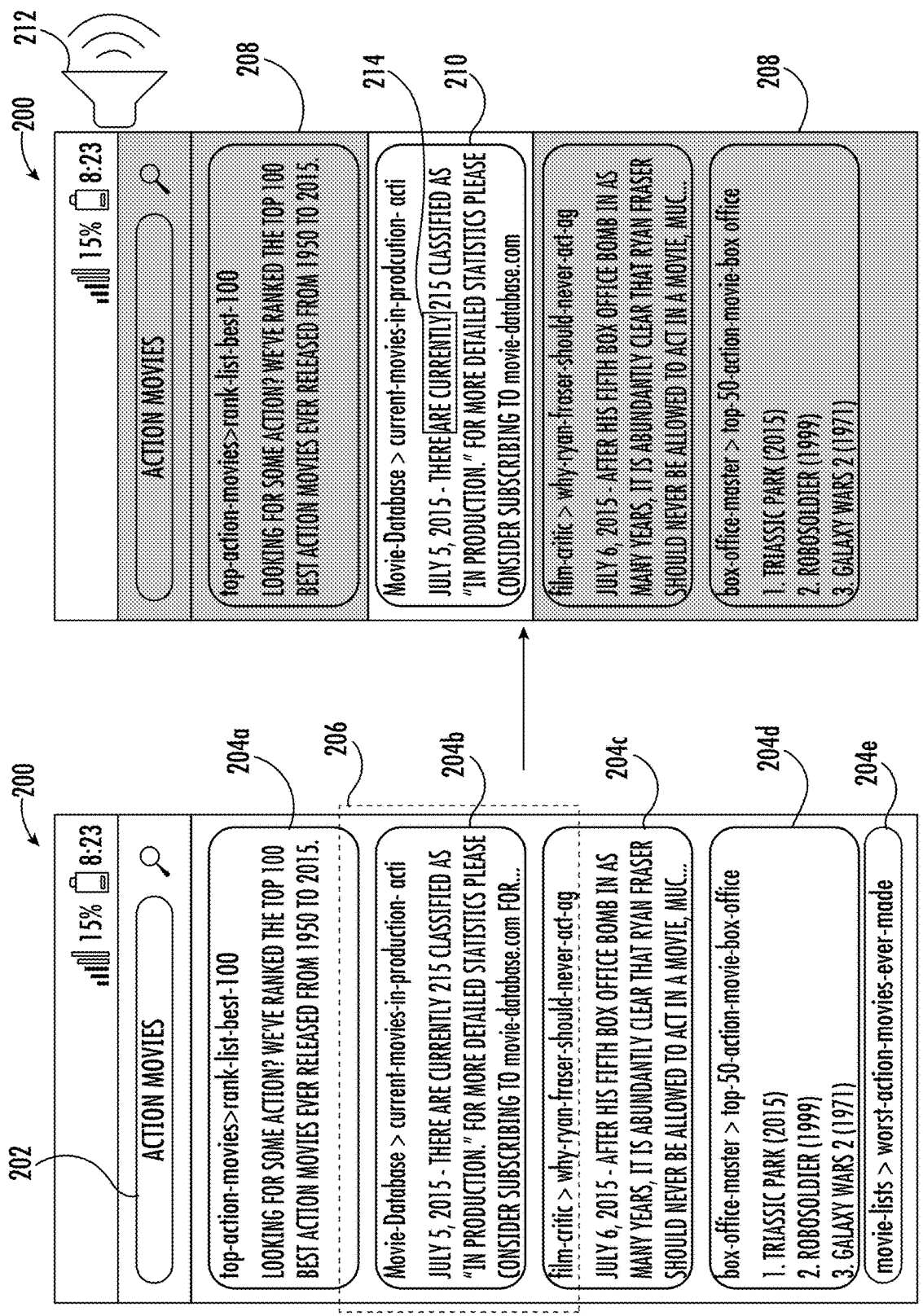

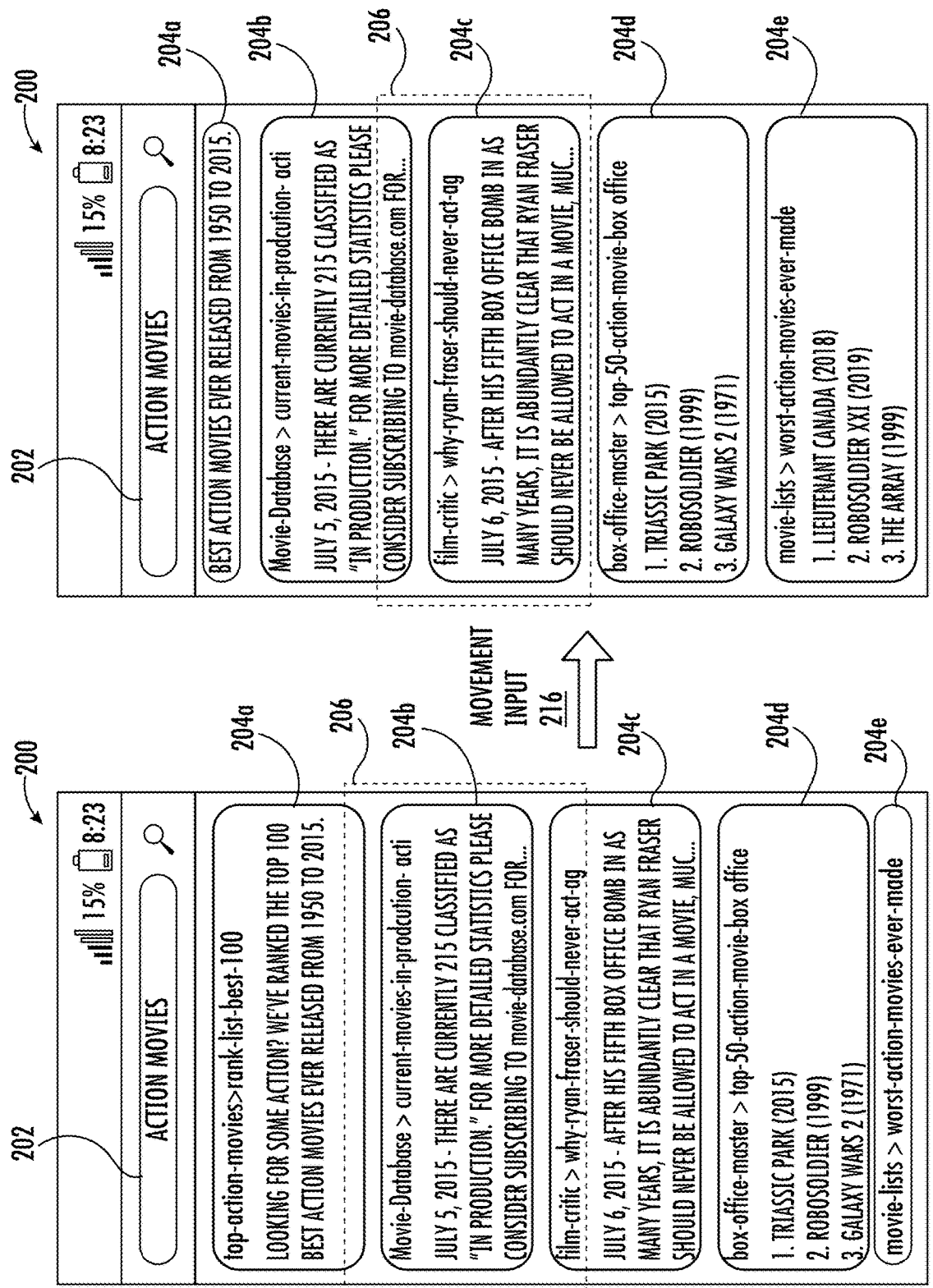

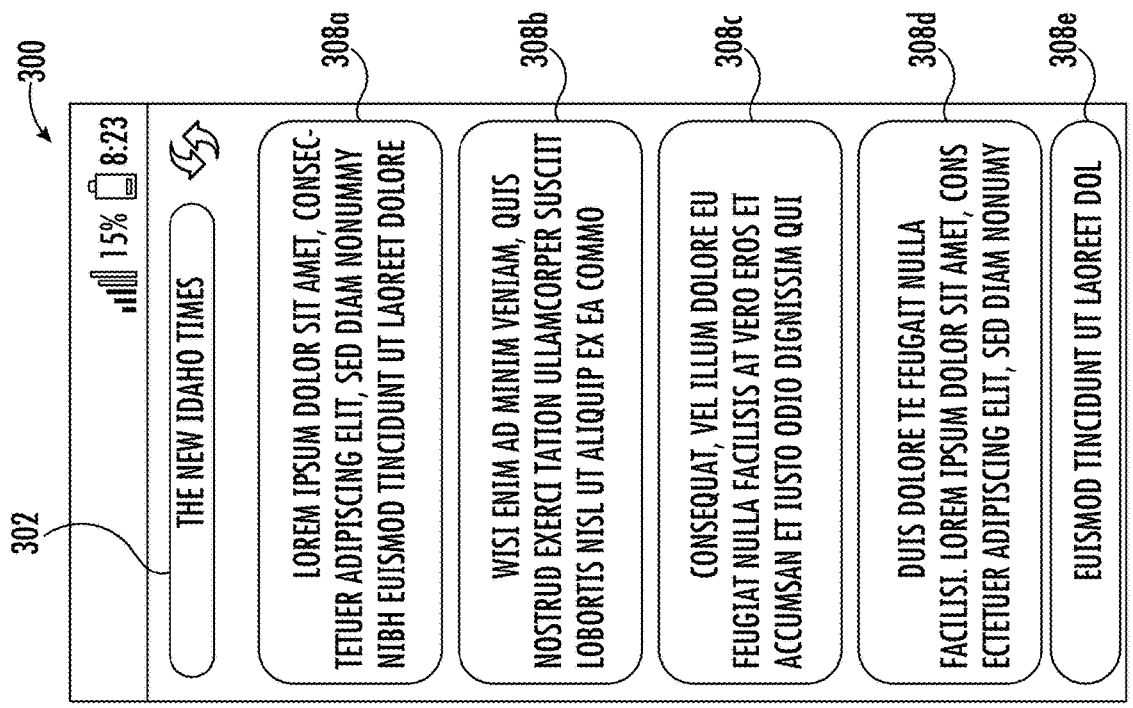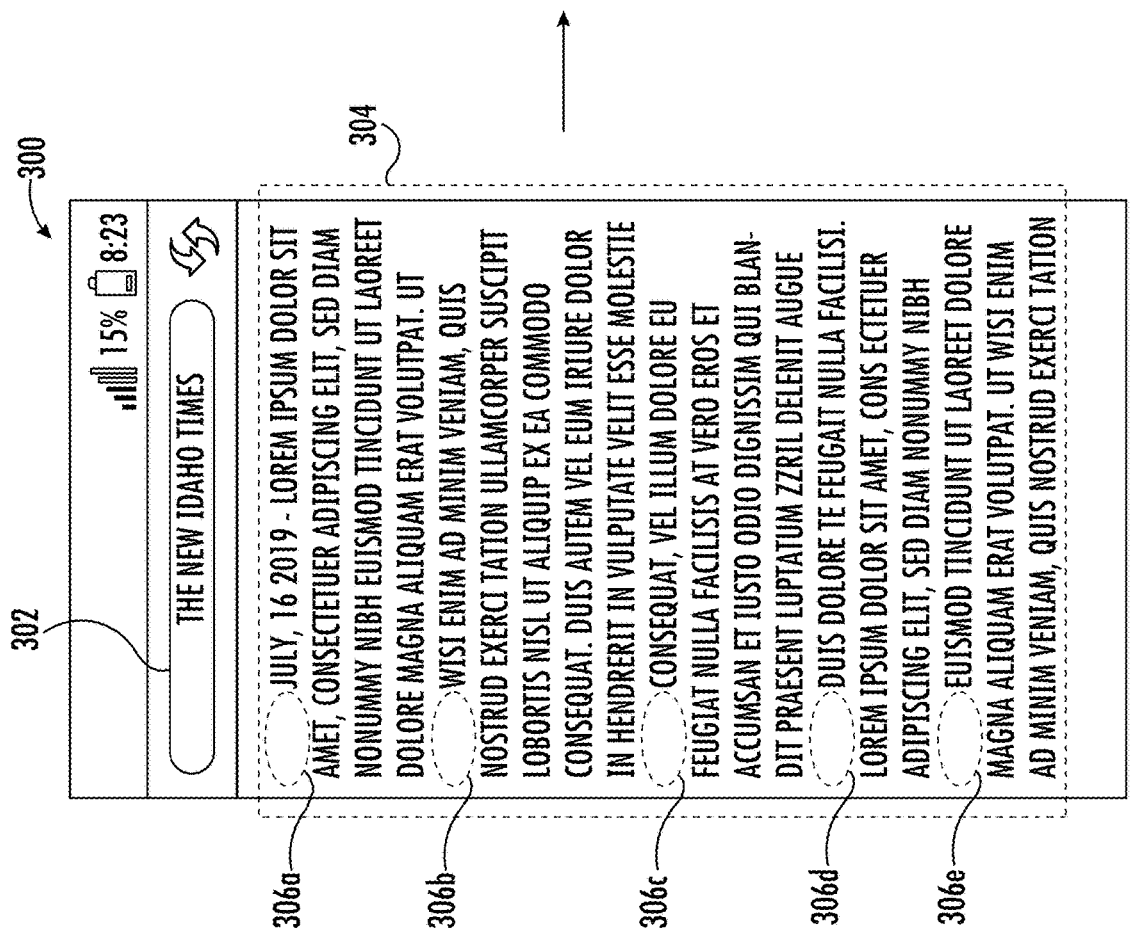
FIG. 3A
FIG. 3B

AUTOMATIC AUDIO PLAYBACK OF DISPLAYED TEXTUAL CONTENT

PRIORITY CLAIM

This application is a continuation of U.S. Non-Provisional patent application Ser. No. 17/052,046 filed on Oct. 30, 2020, which is based upon and claims the right of priority under 35 U.S.C. § 371 to International Application No. PCT/US2019/061401 filed on Nov. 14, 2019. Applicant claims priority to and the benefit of each of such applications and incorporates all such applications herein by reference in their entirety.

FIELD

The present disclosure relates generally to audio playback of textual content. More particularly, the present disclosure relates to systems and methods that provide intuitive audio playback of textual content responsive to user input actions, such as scrolling portions of textual content on a display.

BACKGROUND

Oftentimes, selecting a portion of textual content to initiate text-to-speech playback requires navigating a series of complex menus. For users unfamiliar or uncomfortable with navigating the complex series of menus, selecting textual content for text-to-speech playback can prove a significant challenge. This complexity can cause some users to ignore a text-to-speech feature entirely. In other cases, it can necessitate the development of detailed tutorial services to walk users through the process required to access text-to-speech services for portions of textual content.

Even for those who are familiar with menu navigation, the process of selecting text repetitively can prove an inefficient use of device resources and a source of frustration to the user. As an example, a user wishing to select a few paragraphs in an article for text-to-speech playback is forced to repetitively navigate menus for each paragraph they wish to play. As another example, a device must devote processing and battery resources to servicing each request.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by one or more computing devices, data descriptive of one or more items of content that include a plurality of portions of textual content. The method includes determining, by the one or more computing devices, positional data that indicates respective positions of one or more of the portions of textual content on a display associated with the one or more computing devices. The method includes receiving, by the one or more computing devices, data indicative of a user input that modifies the respective positions of the one or more of the portions of textual content relative to a display. The method includes, responsive to receiving the data indicative of the user input, determining, by the one or more computing devices, updated positional data that indicates respective updated positions of the one or more of the portions of textual content. The method includes, responsive to receiving the data indicative of the user input, identifying, by the one or more computing devices and based at least in part on the updated positional data, that a first portion of textual content is positioned within a playback area of the display. The method includes, responsive to receiving the data indicative of the user input, causing, by the one or more computing devices, playback of an audio signal that includes speech of at least a portion of the first portion of textual content.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

FIGS. 2A-2B depict a user interface interaction associated with a first portion of textual content being positioned in a playback area according to example embodiments of the present disclosure.

FIGS. 2C-2D depict a user interface interaction associated with a second portion of textual content being positioned in a playback area according to example embodiments of the present disclosure.

FIGS. 3A-3B depict a method for dividing an unstructured item of content into a plurality of portions of textual content according to example embodiments of the present disclosure.

DETAILED DESCRIPTION

Overview

Figure 1A:
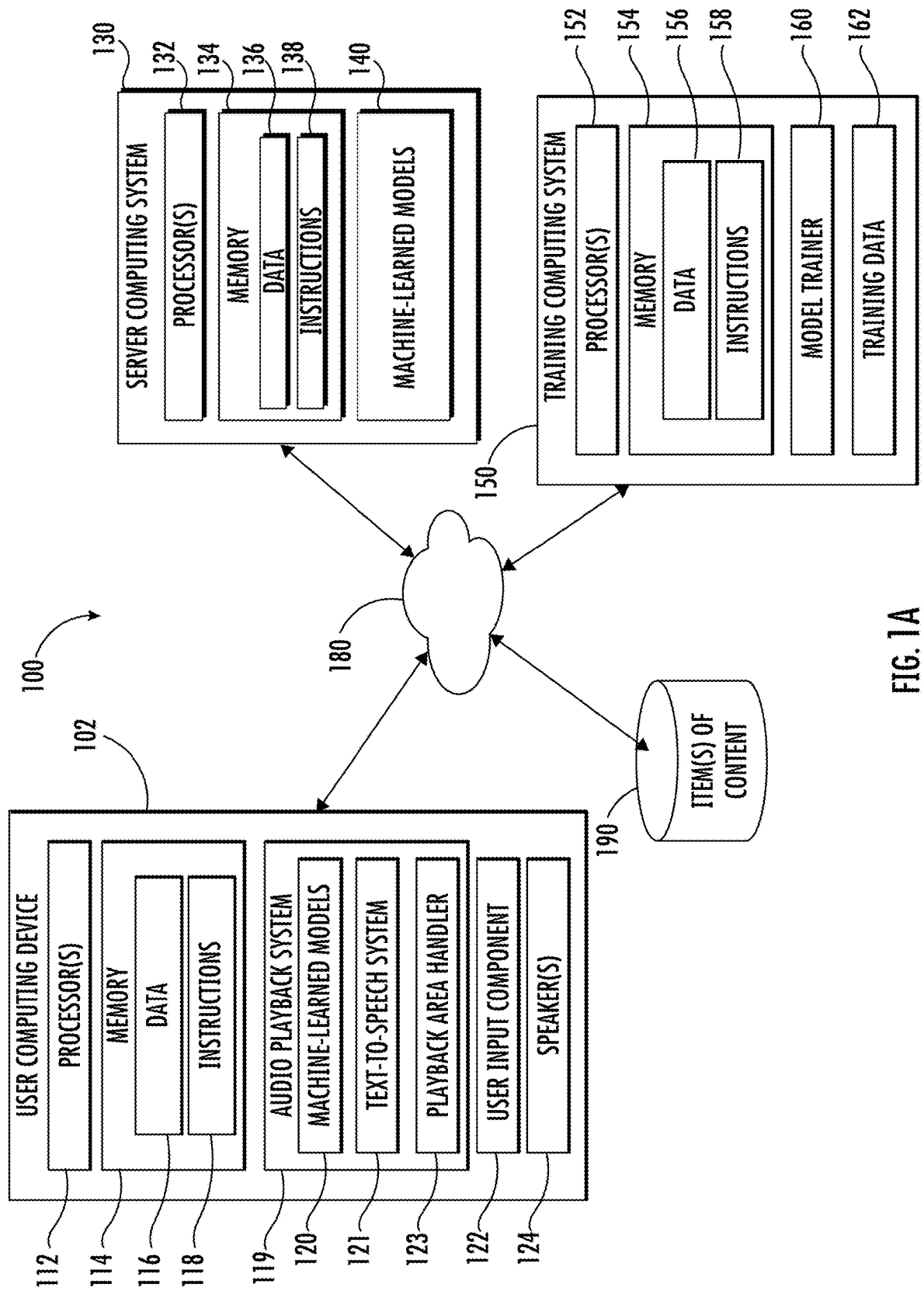
FIG. 1A depicts a block diagram of an example computing system according to example embodiments of the present disclosure.

Example aspects of the present disclosure are directed to systems and methods that provide intuitive audio playback of textual content responsive to user input actions, such as scrolling portions of textual content on a display. In particular, systems and methods described herein are directed to playback of audio (e.g., text-to-speech audio) that includes textual content positioned by a user input at a certain position on a device display. Thus, as one example, a user can simply scroll through a webpage or other content item to cause a text-to-speech system to perform audio playback of textual content displayed in one or more playback section(s) of the device's viewport (e.g., rather than requiring the user to perform additional tapping or gesturing to specifically select a certain portion of textual content). The proposed techniques represent a powerful adjustment to the navigational control for text to speech readout. In particular, by controlling the text-to-speech via scrolling instead of tapping or gesturing, the proposed systems provide more intuitive playback controls for users that are novices or otherwise not technologically sophisticated.

As one example, a computing device (e.g., a user device such as a smartphone) can obtain one or more items of content that include a plurality of portions of textual content (e.g., a plurality of search results corresponding to a search request). The computing device can further receive a user input (e.g., a scroll operation that scrolls the content down the display) and corresponding positional data indicating where each portion of textual content was moved on the display of the computing device. As one example, the computing device may receive positional data indicating that a first portion of textual content (e.g., a search result) was moved to the top half of the display. More particularly, if a portion of textual content is moved into a playback area on the display, the computing device can perform audio playback including at least some of the portion of textual content. As one example, if a search result is moved to a playback area of the display, the computing device can provide playback of an audio signal including a summary of the contents of the search result. As another example, if a paragraph of a news article is moved to a playback area of the display, the computing device can provide playback of an audio signal including speech of the entire paragraph. In such fashion, a user is able to purposely move a portion of textual content to a certain position of the display to cause playback of an audio signal. Thus, a user is able to begin playback with a single user input instead of navigating a series of complicated menus to enable the service. In some implementations, the methods described herein are initiated responsive to a voice search.

The present disclosure provides a number of technical effects and benefits. As one example technical effect and benefit, the systems and methods of the present disclosure enable a significant reduction in user inputs required to perform operations with a computing device. By providing automatic playback of textual content when a portion of textual content is located in a playback area, a user is no longer required to select a portion of textual content and then perform a series of inputs that causes the computing device to begin playback. The elimination of these additional user-device interactions saves significant processing, battery, and memory resources that are associated with handling a complex series of user inputs.

As another example technical effect and benefit, the systems and methods of the present disclosure substantially decrease device interaction complexity and the confusion associated with accessing device services. For example, a user would previously be required to memorize the series of menu interactions that enable audio playback of textual content. This memorization requirement can necessitate the creation of tutorial services to teach users how to manipulate audio playback menus, which in turn can lead to both increased development costs and user frustration. The systems and methods of the present disclosure eliminate these requirements by automatically providing intuitive playback, leading to decreased device interaction complexity and reducing the need to create user tutorial services.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

More particularly, prior textual content playback methods have caused a number of problems related to user-device interaction. As one example, prior methods necessitate the existence of a playback menu item overlaid on a portion of the display for the user to interact with. This playback menu item can reduce the amount of display space available to the user and can potentially obscure underlying textual content. As another example, the prior methods could generally be considered unintuitive by users. For example, the complicated series of steps required to utilize prior playback methods required a degree of user device knowledge that was rarely possessed by all users. The proposed systems overcome these problems by eliminating the need for a playback menu item and significantly reducing the learning curve associated with operating textual content playback services.

The one or more computing devices of the present disclosure can obtain items of content that include portions of textual content. In some implementations, an item of content can be one or more search results responsive to a search query. As one example, the one or more computing devices can, responsive to a search query, obtain item(s) of content (e.g., a plurality of search results) including a plurality of portions of textual content (e.g., each search result of the plurality of search results). As another example, an item of content can be a single search result (e.g., a list of best action movies) including a plurality of portions of textual content (e.g., each movie in the list of movies). As another example, an item of content can be a webpage or web document, text document (e.g., PDF or word processing document), an image that includes textual content (e.g., an image captured by the user that depicts advertisements, street signage, or the like), and/or any other content that includes text.

In some implementations, the plurality of portions of textual content can be presented in or included within a card format. A card format can serve to structure the portion of textual content into a textual content card (e.g., a card containing various snippets of the portion of textual content). As one example, each search result of a search result query can be presented in or included within its own textual content card. As another example, a plurality of search results can be summarized in a single textual content card. A textual content card can organize a portion of textual content in a manner that facilitates playback of an audio signal. As an example, the textual content card may emphasize the title and relevant contextual information of a webpage corresponding to a search result. As will be discussed in more detail in another section, a textual content card can include one or more portions of textual content from an unstructured item of content. For instance, a plurality of paragraphs corresponding to a news article can be formatted into individual textual content cards to provide structure to the item of content.

In some implementations, the items of content can be a webpage or other form of web document. The plurality of portions of textual content can respectively be divided by paragraphs, headlines, captions, or other such divisions of textual content. As one example, an item of content (e.g., an archived newspaper page including a plurality of news stories) can be structured into a plurality of textual content cards, each textual content card representing a portion of textual content from the item of content (e.g., the title of a news story and a first paragraph from the news story). As another example, a webpage including a single news article can be structured into a plurality of textual content cards associated with portions of textual content, each textual content card containing either an article header or paragraph of textual content.

In some implementations, the items of content can be unstructured or otherwise include unstructured text. Unstructured content can be, for example, an article that has no clear divisions between headings, articles, paragraphs, etc. In such cases, obtaining the portions of textual content can include determining a plurality of portions of textual content from the unstructured textual content. As one example, webpages and other digital items of unstructured content can be divided into portions of textual content based at least in part on digital markup elements associated with the items of content. As an example, a webpage can be divided into portions of textual content based at least in part on metadata associated with the webpage (e.g., hypertext markup language paragraph tags associated with the webpage). In another example, in some implementations, machine intelligence (e.g., machine-learned models) can be used to divide unstructured content into portions of textual content. For example, based on user feedback, user-desired behavior, and other relevant training data, machine intelligence can determine where to divide an item of content into portions of textual content.

According to another aspect of the present disclosure, the one or more computing devices can determine the positions of the one or more of portions of textual content relative to the computing device display. In some implementations, positional data can indicate the positions of all portions of textual content relative to the display, regardless of whether the portions of content are positioned on the display. As an example, positional data might indicate that a first portion of textual content is in the upper 20% of the display. As another example, positional data might indicate that a second portion of textual content not currently displayed is positioned a certain distance under the one or more portions of textual content currently displayed. Positional data can be obtained, for example, from an application (e.g., browser application) that is presenting or otherwise handling the item of content, from a separate application that monitors the device display, and/or from other sources of positional data.

According to another aspect of the present disclosure, the one or more computing devices can receive a user input that modifies the positions of the portions of textual content. The user input can correspond to a physical user action. As one example, the user can scroll the display up or down using a touch input (e.g., by placing a finger or stylus on a touch sensitive display and sliding up or down). As another example, the user can scroll the display using a voice command. As yet another example, the user can scroll the display using a gesture or physical movement recognized by the computing device.

The user input can modify the respective positions of one or more portions of textual content by moving the one or more portions of textual content relative to the display. As one example, a user scroll input can move the display so that a previously displayed portion of textual content is now positioned above the display. As another example, a user gesture input can move a portion of textual content from the bottom half of a display to the top half of a display.

After receiving a user input, the one or more computing devices can determine updated positions of the one or more portions of textual content. As one example, a portion of textual content previously not positioned on the display (e.g., a textual content card associated with a search result) can possess an updated position that is positioned on the display. As another example, a portion of content previously positioned on the display can possess an updated position that is not positioned on the display.

According to another aspect of the present disclosure, the one or more computing devices can identify that a first portion of textual content is positioned within a playback area of the display. The playback area of the display can be an area of the screen that enables audio playback associated with the first portion of textual content. As one example, if the first portion of textual content is positioned within the playback area, the one or more computing devices can enable audio playback including the portion of textual content. In some embodiments, a plurality of portions of textual content can be identified as being positioned in the playback area. For example, two relatively small textual content cards (e.g., in relation to the size of the display) may both fit in the playback area of the display simultaneously.

In some embodiments, the playback area can be defined as a rectangular portion of the display. The size and location of the playback area can be determined in a plurality of ways. As one example, the size and location of the playback area can be determined by user preferences. A settings menu can exist that allows the user to determine the location and dimensions of the playback area. For example, a user can determine that the playback area should be a small rectangle positioned in the middle of the display. Another user may choose to enlarge the playback area and position the playback area at the very top of the display. As another example, the size and location of the playback area can be determined at least in part by machine intelligence (e.g., machine-learned models). For example, the computing device can use machine intelligence to analyze past user behavior and determine a size and location of the playback area that is most preferred by the user in question. Alternatively or additionally, the size and location of the playback area can be predefined and/or static.

In some embodiments, the playback area can be moved by a user to other parts of the display. A user input can move the playback area of the display to place it on another portion(s) of textual content. As one example, if operating a tablet device with a relatively large display capable of displaying multiple portions of textual content (e.g., a scanned newspaper article with multiple columns), a user can drag the playback area from one portion of textual content (e.g., a paragraph) to another without moving the position of the underlying content. In this fashion, the user can selectively identify the portion(s) of textual content they wish to place inside the playback area. Consequently, the playback area can possess a visual effect (e.g., a semi-transparent shading associated with the area of the playback area) to further enable the user to accurately move the playback area.

In some embodiments, the playback area can be associated with one or more visual effects. As one example, the playback area can possess a semi-transparent shading to enable user movement of the playback area. As another example, the display area and/or portions of the display other than the playback area can possess a visual effect. As an example, the playback area can lack a visual effect while all other portions of the screen are covered with a reduced brightness visual effect and/or blurring visual effect to emphasize the text that is positioned in the playback area. In some embodiments, the portion of textual content positioned in the playback area can also possess one or more visual effects. As an example, individual characters can be sequentially emphasized (e.g., enlarged, bolded, highlighted, etc.) as they are positioned in the playback area and/or played back by the text-to-speech system. As another example, the entire one or more portions of textual content positioned in the playback area can be emphasized (e.g., enlarged, bolded, highlighted, etc.) while the one or more portions of textual content positioned in other areas of the display can be deemphasized (e.g., shrunk, moved off-display, blurred, darkened, etc.). As an example, the title of content included in a textual content card can be highlighted as it is included in playback of an audio signal.

In some embodiments, the computing device can pause for a period of time before identifying that a portion of textual content is displayed within the playback area. By pausing for a period of time, the computing device can ensure that the user purposely positioned the portion of textual content in the playback area (or vice-versa). As one example, the period of time can be determined based on user preferences. As another example, the period of time can be determined based on a number of other factors (e.g., the number of portions of textual content, the user's previous preferences and actions, the user input moving the textual content, etc.).

According to another aspect of the present disclosure, the one or more computing devices can provide playback of an audio signal that includes the portion of textual content. In some implementations, the audio signal can include contextual information associated with the first portion of textual content. Contextual information can include a summary, a brief description, a title, and/or a list of items included in the first portion of textual content. As one example, a search result containing a list of twenty local restaurants can be summarized by only playing the top three results. As another example, a list of all actors in movie Z can be briefly described as "a list of actors in the movie Z." As another example, an audio signal of a search result including a news article can only include the title of the news article. In some embodiments, after playback of an audio signal that includes the first portion of textual content, the one or more computing devices can automatically scroll to the next portion of textual content to begin playback of an audio signal that includes the next portion of textual content. In some implementations, playback of the audio signal is dependent on an initial user input. As an example, the one or more computing devices can request user confirmation using a button adjacent to the playback area, and the user can press the button to confirm playback of an audio signal.

In some implementations, the audio signal can be determined at least in part by machine intelligence (e.g., machine-learned models). Machine intelligence can be used to determine the preferred portion and format of a portion of textual content to be included in an audio signal. As one example, machine-learned models can identify that a user prefers to include only a brief description of each portion of textual content in the audio signal. As another example, machine-learned models can determine that a second user prefers to include the entire portion of textual content in the audio signal. As another example, machine-learned models can determine that a third user prefers different portions and formats of textual content to be included in an audio signal based on the type of textual content to be included.

In some implementations, the audio signal can further include conversion of the portion of textual content from one language to another. The audio signal can provide language translation based on user preferences. For example, a user may be browsing a document written in a foreign language. The one or more computing devices can selectively provide audio signal translation for portions of textual content located in the playback area. This can enable the user to quickly receive a specific translation of a portion of textual content if the user is aware of the position of textual content they wish to be translated.

As another example, character recognition can be selectively performed to recognize characters in portion(s) of unrecognized textual content (e.g., a scanned document without digital character identifiers) moved to the playback window. The computing device can wait to perform character recognition until the portion of textual content is positioned in the playback window, saving time and processing resources associated with performing character recognition on the entire item of content. As an example, a user can browse a PDF document containing unrecognized textual content. The computing device can wait until a portion of the PDF is positioned in the playback area before performing character recognition and including the recognized characters in the audio signal.

In some implementations, the methods described herein are initiated responsive to a voice search. As an example, a search initiated by a user touch command will not activate the playback of an audio signal including a first portion of textual content located in a playback area. As another example, a search initiated by a user voice search will activate the playback of an audio signal including a first portion of textual content located in a playback area.

According to another aspect of the present disclosure, the one or more computing devices can stop playback of the audio signal based on a second user input. More particularly, the computing device can stop playback of the audio signal if the portion(s) of textual content currently positioned in the playback area are moved by a user input out of the playback area. As one example, the user may perform a scroll input and move a portion of textual content included in the current audio signal out of the playback area. If the portion of textual content is moved out of the playback area, the computing device can stop playback and then determine if a new portion of textual content is positioned in the playback area. If a new portion of textual content is positioned in the playback area, the computing device can begin playback of an audio signal including the new portion of textual content.

Any of the machine intelligence (e.g., machine-learned models) described herein can be trained based on user feedback (e.g., user indications that the performed operations were correct or incorrect). User feedback can be aggregated across multiple users to generate (e.g., re-train) a global model and/or user-specific feedback can be used to personalize (e.g., re-train) a personalized model. As an example, user feedback can indicate if the playback area is the wrong size and/or in the wrong location and/or if an item of content is being divided into a plurality of portions of textual content correctly/incorrectly. Re-training the models based on user feedback can enable improved model performance moving forward.

Thus, the systems and methods of the present disclosure provide, in addition to intuitive playback of textual content responsive to user input actions, a variety of other ancillary services such as text summarization and/or machine intelligence-based user preference management. As such, the systems and methods of the present disclosure can drastically decrease the complexity inherent to navigating complex menus and instructing a computing device to cause audio playback of a specific piece of content.

With reference now to the FIGS., example embodiments of the present disclosure will be discussed in further detail. FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can include an audio playback system 119 that implements the playback experience described herein. The audio playback system 119 can be an application, a plug-in (e.g., a plug-in for a browser application), or other forms of software implementable by the one or more processors 112. The user computing device 102 can access one or more items of content 190 (e.g., over the network 180 and/or from the local memory 114) and the audio playback system 119 can generate an audio playback experience for textual content included in the one or more items of content 190 (e.g., a plurality of search results, a single search result, a text document, a webpage, a web document, a PDF, an image, etc.)

In some implementations, the user computing device 102 (e.g., the audio playback system 119) can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a semantic entity identification service). Thus, one or more models 120 can be stored and implemented at the user computing device 102 and/or one or more models 140 can be stored and implemented at the server computing system 130.

The audio playback system can also include a TTS system 121. The TTS system can perform any number of TTS techniques to generate an audio signal (e.g., audio signal 212 of FIG. 2B) that includes speech of text. The audio playback system can also include a playback area handler 123. One or more portions of textual content can be determined to be positioned in the playback area by the playback area handler 123. The playback area handler 123 can further determine the location, size, and sensitivity of the playback area based on a number of factors (e.g., user settings, previously analyzed user behavior, machine-learned analysis of global user behavior, etc.).

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 102 can also include one or more speakers 124. The speakers 124 can be physically connected to the device 102 or not physically connected to the device 102. The speakers 124 can include stand-alone speakers, earbuds, or the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models.

Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, user feedback or data descriptive of user actions performed in response to various playback experience settings or operations.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
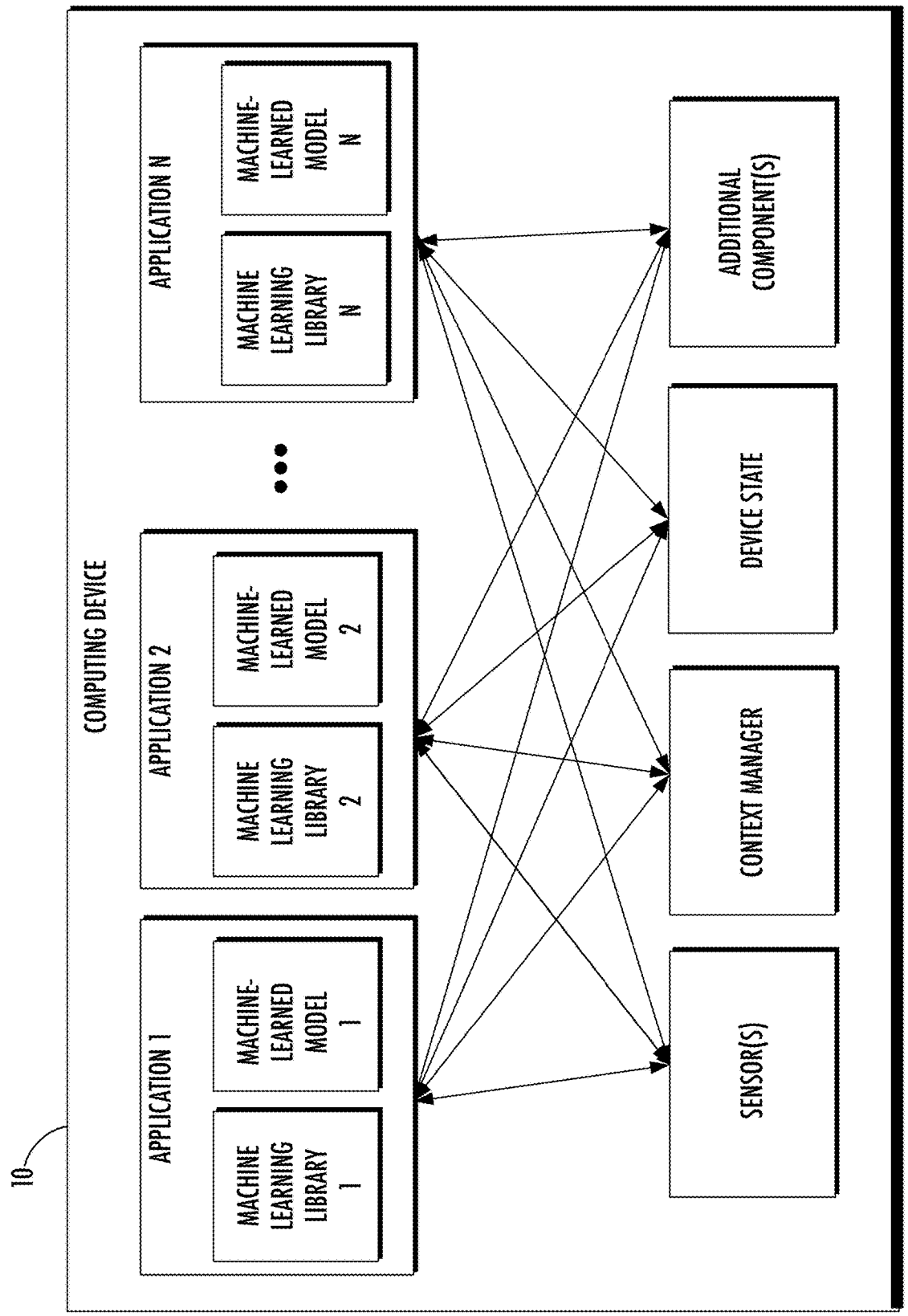
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
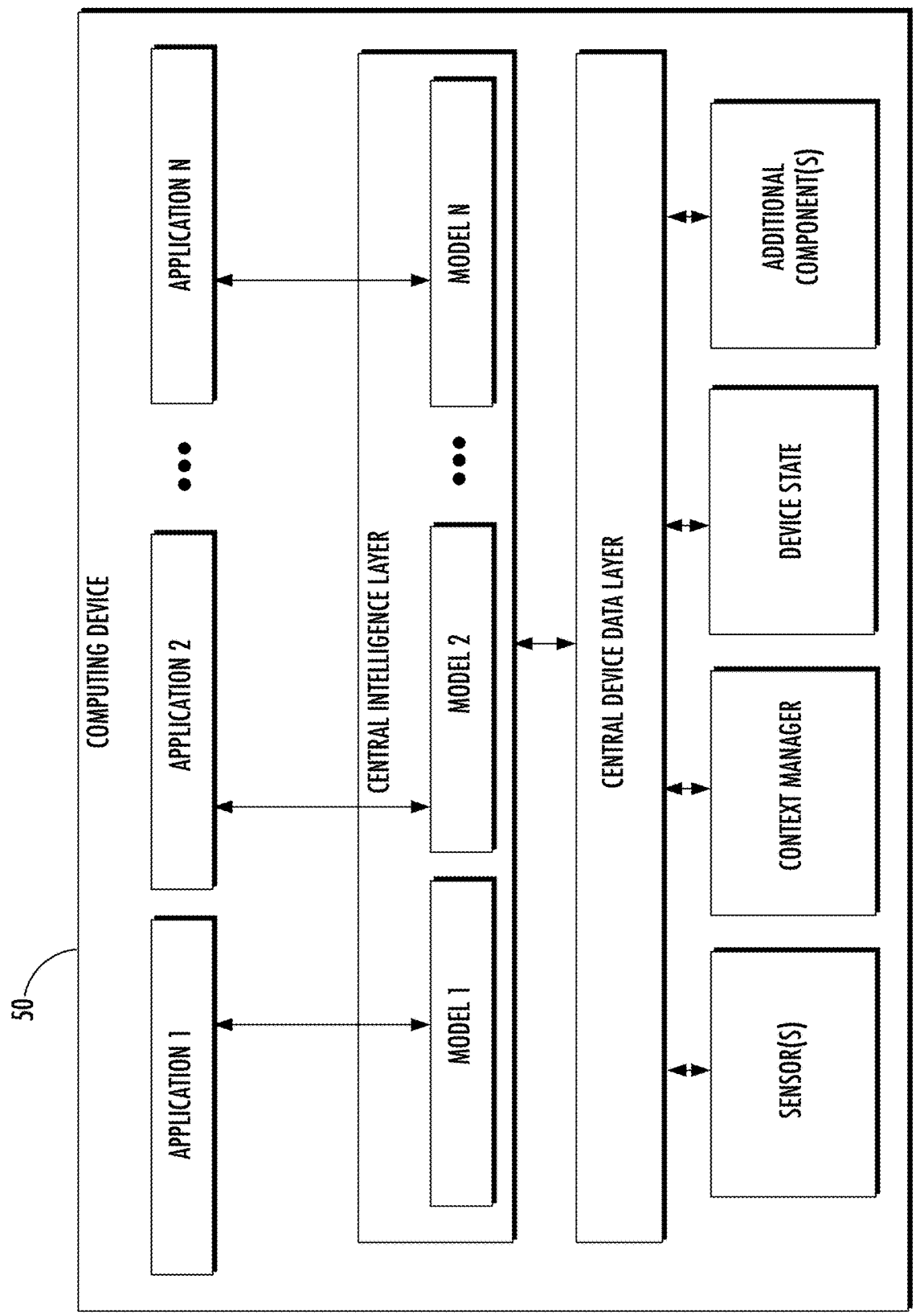
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIGS. 2A-2B depict a user interface interaction associated with a first portion of textual content being positioned in a playback area according to example embodiments of the present disclosure. At FIG. 2A, the computing device display 200 includes a plurality of display elements. The display elements include search query 202, portions of textual content 204a-204e (e.g., search results), and playback area 206. The entirety of the textual results associated with search query 202 can be referred to, in some embodiments, as an item of content. The portions of textual content 204, as demonstrated in FIG. 2, can be a plurality of search results. In other embodiments, the portions of textual content 204 can be a single search result, paragraphs in a web document, columns in a news article, etc. As will be demonstrated in FIGS. 3A-3B, an unstructured item of content can be divided into portions of textual content 204.

The portions of textual content 204 can be presented in or included within a card format. A card format can serve to structure a portion of textual content into a textual content card (e.g., a card containing various snippets of the portion of textual content). As one example, each portion of textual content 204 associated with search query 202 is presented in its own textual content card. As another example, the portions of textual content 204 can be summarized in a single textual content card. A textual content card can organize a portion of textual content in a manner that facilitates playback of an audio signal (e.g., audio signal 212). As an example, the portions of textual content 204 each include associated URL information (e.g., "moviedatabase>current-movies-in-production" included in portion of textual content 204b) as well as a selected portion of textual content from the associated search result (e.g., the top three movies included in portion of textual content 204d).

Figure 4:
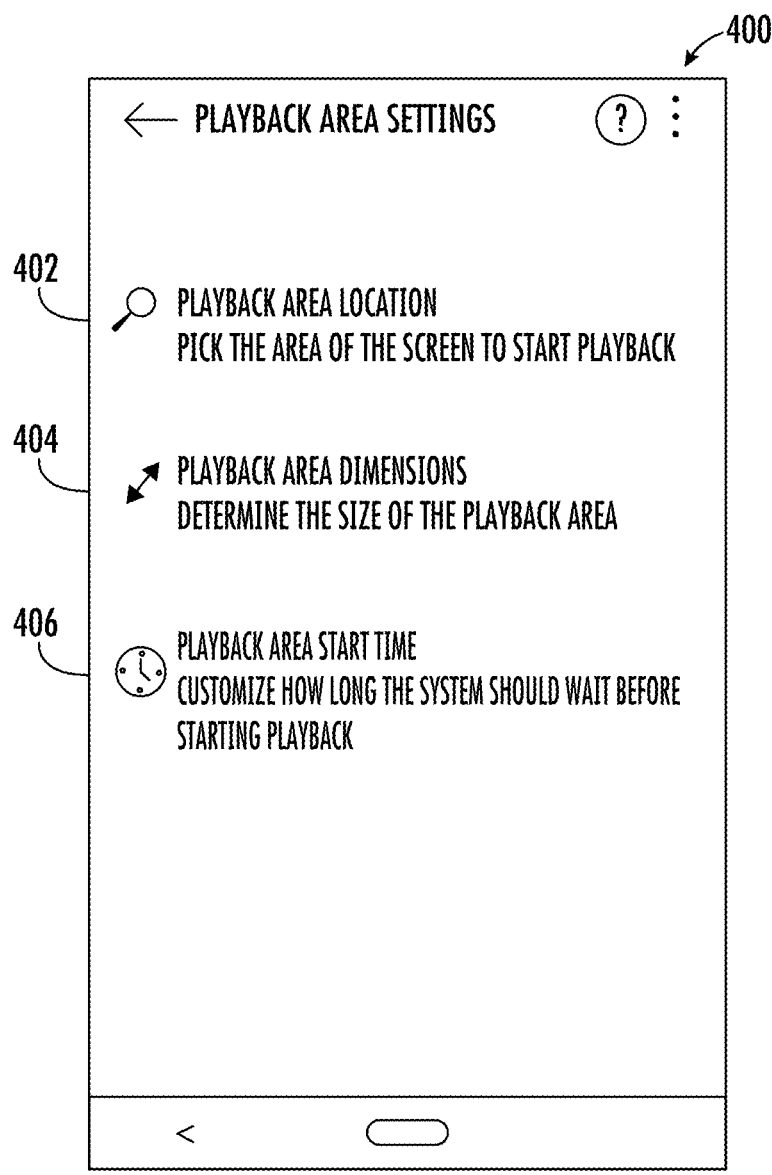
FIG. 4 depicts a user interface for modifying user playback area settings according to example embodiments of the present disclosure.

The playback area 206 can be an area of the screen that enables playback of an audio signal 212 including at least a portion of a first portion of textual content 204. As one example, a first portion of textual content 204b is positioned within the playback area 206. The computing device(s) 200 can enable playback of an audio signal 212 including at least a portion of the first portion of textual content 204b. The audio signal can include converting a portion of the first portion of textual content 204b to speech. The audio signal can further include conversion of the first portion of textual content 204b from a first language to a second language. The audio signal can also include contextual information associated with the first portion of textual content 204b. As depicted in FIG. 4, the audio signal can be based at least in part on user preferences. The audio signal can also be based at least in part on machine intelligence (e.g., machine learned models 120). In some embodiments, a plurality of portions of textual content (e.g., 204b and 204c) can be identified as being positioned in the playback area and can be included in audio signal 212.

In some embodiments, playback of the audio signal 212 can further include determining that the first portion of textual content 204b includes unrecognized textual content. As an example, first portion of textual content 204b can include unrecognized textual content (e.g., a PDF including a newspaper scan without digital character identifiers). If the first portion of textual content 204b contains unrecognized textual content, the computing device(s) 200 can perform character recognition to recognize characters included in the unrecognized textual content. The computing device(s) 200 can wait until the portion of textual content including unrecognized text is positioned in the playback area before performing character recognition and including the recognized characters in the audio signal The playback area 206 can be defined as a rectangular portion of the display. The size and location of the playback area 206 can be determined in a plurality of ways. As one example, the size and location of the playback area 206 can be determined by user preferences, as depicted in FIG. 4. As another example, the size and location of the playback area 206 can be determined at least in part by machine intelligence (e.g., machine-learned models 120). For example, the computing device(s) 200 can use machine intelligence to analyze past user behavior and determine a size and location of the playback area 206 that is most preferred by the user in question. Alternatively or additionally, the size and location of the playback area 206 can be predefined and/or static.

The playback area 206 can be moved by a user to other parts of the display. A user input can move the playback area 206 of the display to place it on another portions of textual content 204. As one example, a user can drag the playback area from portion of textual content 204b to portion of textual content 204c without moving the position of the underlying portions of textual content 204. In this fashion, the user can selectively identify the portions of textual content 204 they wish to place inside the playback area 206. Consequently, the playback area 206 can possess a visual effect (e.g., a semi-transparent shading associated with the area of the playback area) to further enable the user to accurately move the playback area. However, the playback area 206 does not necessarily require a visual effect in all embodiments.

The computing device(s) 200 can pause for a period of time before identifying that a portion of textual content 204 is displayed within the playback area. By pausing for a period of time, the computing device(s) 200 can ensure that the user purposely positioned the portion of textual content 204 in the playback area (or vice-versa). As one example, as will be depicted in FIG. 4, the period of time can be determined based on user preferences. As another example, the period of time can be determined based on a number of other factors (e.g., the number of portions of textual content, the user's previous preferences and actions, the user input moving the textual content, etc.). For example, the computing device(s) 200 may pause for 1.5 seconds before determining that portion of textual content 204b is positioned in playback area 206.

At FIG. 2B, the computing device display 200 includes a plurality of visual effects (e.g., 208, 210, 214) associated with determining that a portion of textual content 204 is positioned in the playback area 206. When a portion of textual content 204 is determined to be positioned in playback area 206, a deemphasizing effect 208 can be used to deemphasize non-playback portions of the display. The deemphasizing effect 208 can include a shrinking effect, moved of the non-playback portions off-display, a blurring effect, a darkening effect, or any other effect meant to demonstrate that the portion of the display is not the playback area.

An emphasizing effect 210 can be used to emphasize the playback area 206. In some embodiments, the emphasizing effect 210 can be used when a portion of textual content is determined to be positioned in the playback area 206. In other embodiments, the emphasizing effect 210 can be used even when a portion of textual content is not determined to be positioned in playback area 206. In this manner, the emphasizing effect 210 can assist users in moving the playback area 206 to another location on the display.

The emphasizing effect 210 can be a semi-transparent shading effect, a bolding of text, or any other effect that can emphasize the position and dimensions of the playback area 206. In addition, the portion of textual content positioned in the playback area can possess a textual emphasizing effect 214. The textual emphasizing effect 214 can be sequential emphasis of individual characters as they are positioned in the playback area 206 and/or played back by the text-to-speech system. This sequential emphasis can include text enlarging, bolding, highlighting, etc. For example, as depicted in FIG. 2B, a portion of a portion of textual content is bolded and italicized by textual emphasizing effect 214. As another example, the textual emphasizing effect 214 can emphasize entire portions of textual content 204 positioned in the playback area 206 (e.g., enlarged, bolded, highlighted, etc.).

FIGS. 2C-2D depict a user interface interaction associated with a second portion of textual content being positioned in a playback area according to example embodiments of the present disclosure. FIG. 2C depicts the same display layout depicted in FIG. 2A, including search result 202 and portions of textual content 204a-e (e.g., search results) positioned in the same relative positions. Movement input 216 changes the relative positions of the portions of textual content depicted in FIG. 2D. As an example, before the movement input 216 is received, the first portion of textual content 204b is positioned in the playback area 206. After the movement input 216 is received, the first portion of textual content 204b has been positioned outside the playback area 206 while the second portion of textual content 204c has been positioned inside the playback area 206.

In some embodiments, the movement input 216 can be a user input. A user input can correspond to a physical user action. As one example, the user can scroll the display up or down using a touch input (e.g., by placing a finger or stylus on a touch sensitive display and sliding up or down). As another example, the user can scroll the display using a voice command. As yet another example, the user can scroll the display using a gesture or physical movement recognized by the computing device.

In some embodiments, the movement input 216 can be computer-generated input. As an example, machine intelligence (e.g., machine-learned models 120) can automatically move the portions of textual content. The automatic movement can be based on previous user behavior and/or global user behavior models. As another example, the automatic movement of the portions of textual content can be based on user preferences. A user can utilize an "auto-scroll" feature that scrolls through an item of content at a speed determined by the user.

Moving the first portion of textual content 204b out of the playback area 206 can cause audio signal playback of the first portion of textual content 204b to stop. As one example, the user may perform a movement input 216 (e.g., a scroll input) and move the first portion of textual content 204b included in the current audio signal playback out of the playback area 206. If the first portion of textual content 204b is moved out of the playback area 206, the computing device(s) 200 can stop playback and then determine if a second portion of textual content 204c is positioned in the playback area 206. If the second portion of textual content 204c is positioned in the playback area 206, the computing device(s) 200 can begin playback of an audio signal including the second portion of textual content 204c.

FIGS. 3A-3B depict a method for dividing an unstructured item of content into a plurality of portions of textual content according to example embodiments of the present disclosure. FIG. 3A includes a title 302 and an unstructured item of content 304. The title 302 can be the title of the unstructured item of content 304 or its source. Items of content (e.g., unstructured item of content 304) can be unstructured or otherwise include unstructured text. Unstructured content can be, for example, an article that has no clear divisions between headings, articles, paragraphs, etc. In such cases, obtaining the portions of textual content can include determining a plurality of portions of textual content from the unstructured textual content.

FIG. 3B depicts an unstructured item of content 304 that has been divided into a plurality of portions of textual content 308 (e.g., 308a, 308b, 308c, 308d, 308e). Unstructured items of content can be divided into a plurality of portions of textual content in a number of ways. As one example, digital items of unstructured content can be divided into portions of textual content based at least in part on digital markup elements associated with the items of content. For example, the unstructured item of content 304 includes digital markup elements associated with paragraph indentations 306 (e.g., 306a, 306b, 306c, 306d, 306e).

Although the paragraph indentations 306 are displayed in FIG. 3A, digital markup elements that are not actively displayed can also be used to divide an unstructured item of content. For example, metadata associated with the webpage (e.g., hypertext markup language header tags associated with headers) can be used to divide an unstructured item of content into a plurality of portions of content. In another example, in some implementations, machine intelligence (e.g., machine-learned models 120) can be used to divide unstructured content into portions of textual content. For example, based on user feedback, user-desired behavior, and other relevant training data, machine intelligence can determine where to divide an item of content into portions of textual content.

FIG. 4 depicts a user interface for modifying user playback area settings according to example embodiments of the present disclosure. Playback area settings interface 400 includes a playback area location setting 402, a playback area dimensions setting 404, and a playback area start time setting 406. In some implementations, the playback area settings interface 400 can include a playback area playback speed setting. The playback speed setting can determine, at least in part, the speed at which a portion of textual content positioned in the playback area is read. As an example, changing the playback area speed setting to a value of 1.25 can cause the speed of audio signal playback to increase by 25% or some other amount. As another example, changing the playback area speed setting to a value of 0.5 can cause the speed of audio signal playback to decrease by 50% or some other amount.

The location of the playback area can be determined based on user-specified playback area location settings 402. As an example, the playback area location settings 402 allow the user to determine the location of the playback area respective to the display of a computing device. For example, a user can determine that the playback area should be a small rectangle positioned in the middle of the display. Another user may choose to enlarge the playback area and position the playback area at the very top of the display.

The dimensions of the playback area can be determined based on user-specified playback area dimension settings 404. As an example, a user can determine that the size and shape of the playback area should be a square that provides enough area to include two portions of textual content. As another example, a second user can determine that the size and shape of the playback area should be a rectangular shape with enough area to include a newspaper column. As yet another example, a third user can determine that the size and shape of the playback area should be a thin rectangle that provides enough area to fit only one portion of textual content.

The playback start time of the playback area can be determined based on user-specified playback area start time settings 406. Setting a specific start time (e.g., a pause time) can serve to ensure that the user purposely positioned a portion of textual content in the playback area (or vice-versa). As one example, a user can specify that playback should start after ½ a second of determining that a portion of textual content is located in the playback area. As another example, a second user can specify that playback should start after 3 seconds of determining that a portion of textual content is located in the playback area.

Playback area settings 400 (e.g., playback area location setting 402, playback area dimensions setting 404, playback area start time setting 406) can be adjusted at least partially by machine intelligence (e.g., machine-learned models 120). Machine intelligence can adjust user-specified playback area settings 400 based at least in part on a detected inefficiency. Machine-learned models 120 can be trained based at least in part on previous and current user behavior, global user behavior, and/or other factors. For example, machine intelligence may determine that a user who has specified a certain playback area location setting 402 exhibits behavior indicating that the playback area location setting 402 can be located in a spot more preferred by the user. In some embodiments, machine intelligence can determine to automatically adjust the associated playback area setting 400 without notifying the user. In other embodiments, the machine intelligence can determine to notify the user before adjusting the playback area setting 400.

Figure 5:
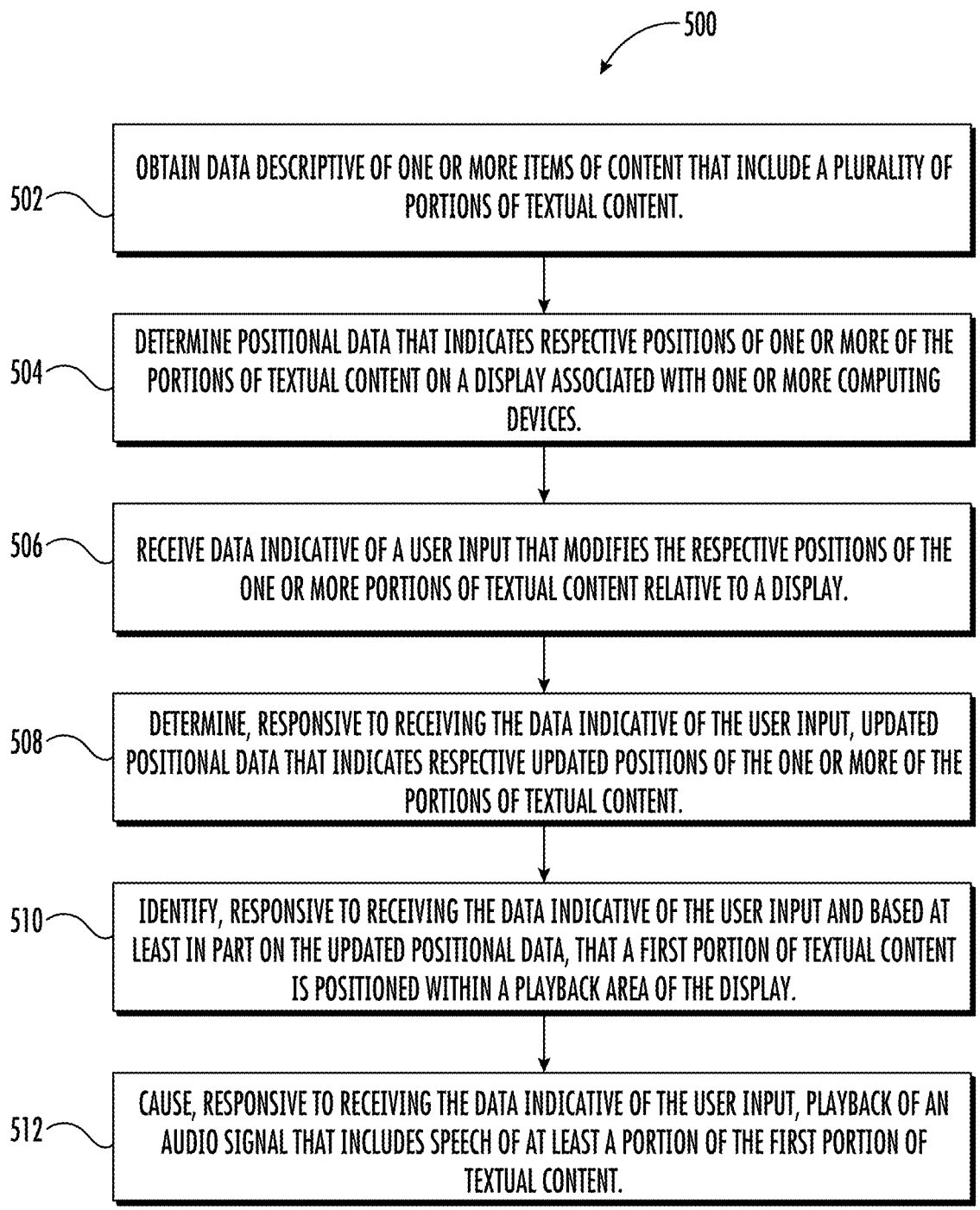
FIG. 5 depicts a flow diagram for an example method of performing audio playback of displayed textual content in accordance with example embodiments.

FIG. 5 depicts a flow diagram for an example method 500 of performing audio playback of displayed textual content in accordance with example embodiments. The method 500 can be implemented, for instance, using computing device(s) of FIG. 1. FIG. 5 depicts steps performed in a particular order for purposes of illustration and discussion. Those of ordinary skill in the art, using the disclosures provided herein, will understand that various steps of any of the methods described herein can be omitted, rearranged, performed simultaneously, expanded, and/or modified in various ways without deviating from the scope of the present disclosure.

At 502, the method can include obtaining data descriptive of one or more items of content that include a plurality of portions of textual content. An item of content can be, for example, one or more search results responsive to a search query. As one example, the one or more computing devices can, responsive to a search query, obtain item(s) of content (e.g., a plurality of search results) including a plurality of portions of textual content (e.g., each search result of the plurality of search results). As another example, an item of content can be a single search result (e.g., a list of best action movies) including a plurality of portions of textual content (e.g., each movie in the list of movies).

A portion of textual content can be a division of an item of content that includes textual content. As an example, an item of content can be a webpage or web document divisible into a plurality of portions of textual content, each portion of textual content a paragraph of the web page or web document. Portions of textual content can be presented in or included within a card format. A card format can serve to structure the portion of textual content into a textual content card (e.g., a card containing various snippets of the portion of textual content). As one example, each search result of a search result query can be presented in or included within its own textual content card. As another example, a plurality of search results can be summarized in a single textual content card. A textual content card can organize a portion of textual content in a manner that facilitates playback of an audio signal. As an example, the textual content card may emphasize the title and relevant contextual information of a webpage corresponding to a search result.

At 504, the method can include determining positional data that indicates respective positions of one or more of the portions of textual content on a display associated with one or more computing devices. Positional data can indicate the positions of all portions of textual content relative to the display, regardless of whether the portions of content are positioned on the display. As an example, positional data might indicate that a first portion of textual content is in the upper 20% of the display. As another example, positional data might indicate that a second portion of textual content not currently displayed is positioned a certain distance under the one or more portions of textual content currently displayed. Positional data can be obtained, for example, from an application (e.g., browser application) that is presenting or otherwise handling the item of content, from a separate application that monitors the device display, and/or from other sources of positional data.

At 506, the method can include receiving data indicative of a user input that modifies the respective positions of the one or more portions of textual content relative to the display. The user input can correspond to a physical user action. As one example, the user can scroll the display up or down using a touch input (e.g., by placing a finger or stylus on a touch sensitive display and sliding up or down). As another example, the user can scroll the display using a voice command. As yet another example, the user can scroll the display using a gesture or physical movement recognized by the computing device.

The user input can modify the respective positions of one or more portions of textual content by moving the one or more portions of textual content relative to the display. As one example, a user scroll input can move the display so that a previously displayed portion of textual content is now positioned above the display. As another example, a user gesture input can move a portion of textual content from the bottom half of a display to the top half of a display.

At 508, the method can include determining, responsive to receiving the data indicative of the user input, updated positional data that indicates respective updated positions of the one or more of the portions of textual content. After one or more portions of textual content have been moved, updated positional data can indicate their new respective positions relative to the screen. As one example, a portion of textual content previously not positioned on the display (e.g., a textual content card associated with a search result) can possess an updated position that is positioned on the display. As another example, a portion of content previously positioned on the display can possess an updated position that is not positioned on the display.

At 510, the method can include identifying, responsive to receiving the data indicative of the user input and based at least in part on the updated positional data, that a first portion of textual content is positioned within a playback area of the display. The playback area of the display can be an area of the screen that enables audio playback associated with the first portion of textual content. As one example, if the first portion of textual content is positioned within the playback area, the one or more computing devices can enable audio playback including the portion of textual content. In some embodiments, a plurality of portions of textual content can be identified as being positioned in the playback area. For example, two relatively small textual content cards (e.g., in relation to the size of the display) may both fit in the playback area of the display simultaneously.

In some embodiments, the playback area can be defined as a rectangular portion of the display. The size and location of the playback area can be determined in a plurality of ways. As one example, the size and location of the playback area can be determined by user preferences. A settings menu can exist that allows the user to determine the location and dimensions of the playback area. For example, a user can determine that the playback area should be a small rectangle positioned in the middle of the display. Another user may choose to enlarge the playback area and position the playback area at the very top of the display. As another example, the size and location of the playback area can be determined at least in part by machine intelligence (e.g., machine-learned models). For example, the computing device can use machine intelligence to analyze past user behavior and determine a size and location of the playback area that is most preferred by the user in question. Alternatively or additionally, the size and location of the playback area can be predefined and/or static At 512, the method can include causing, responsive to receiving the data indicative of the user input, playback of an audio signal that includes speech of at least a portion of the first portion of textual content. In some implementations, the audio signal can include contextual information associated with the first portion of textual content. Contextual information can include a summary, a brief description, a title, and/or a list of items included in the first portion of textual content. As one example, a search result containing a list of twenty local restaurants can be summarized by only playing the top three results.

In some implementations, the audio signal can be determined at least in part by machine intelligence (e.g., machine-learned models). Machine intelligence can be used to determine the preferred portion and format of a portion of textual content to be included in an audio signal. As one example, machine-learned models can identify that a user prefers to include only a brief description of each portion of textual content in the audio signal. As another example, machine-learned models can determine that a second user prefers to include the entire portion of textual content in the audio signal.

In some implementations, the audio signal can further include conversion of the portion of textual content from one language to another. The audio signal can provide language translation based on user preferences. For example, a user may be browsing a document written in a foreign language. The one or more computing devices can selectively provide audio signal translation for portions of textual content located in the playback area. This can enable the user to quickly receive a specific translation of a portion of textual content if the user is aware of the position of textual content they wish to be translated.

Figure 6:
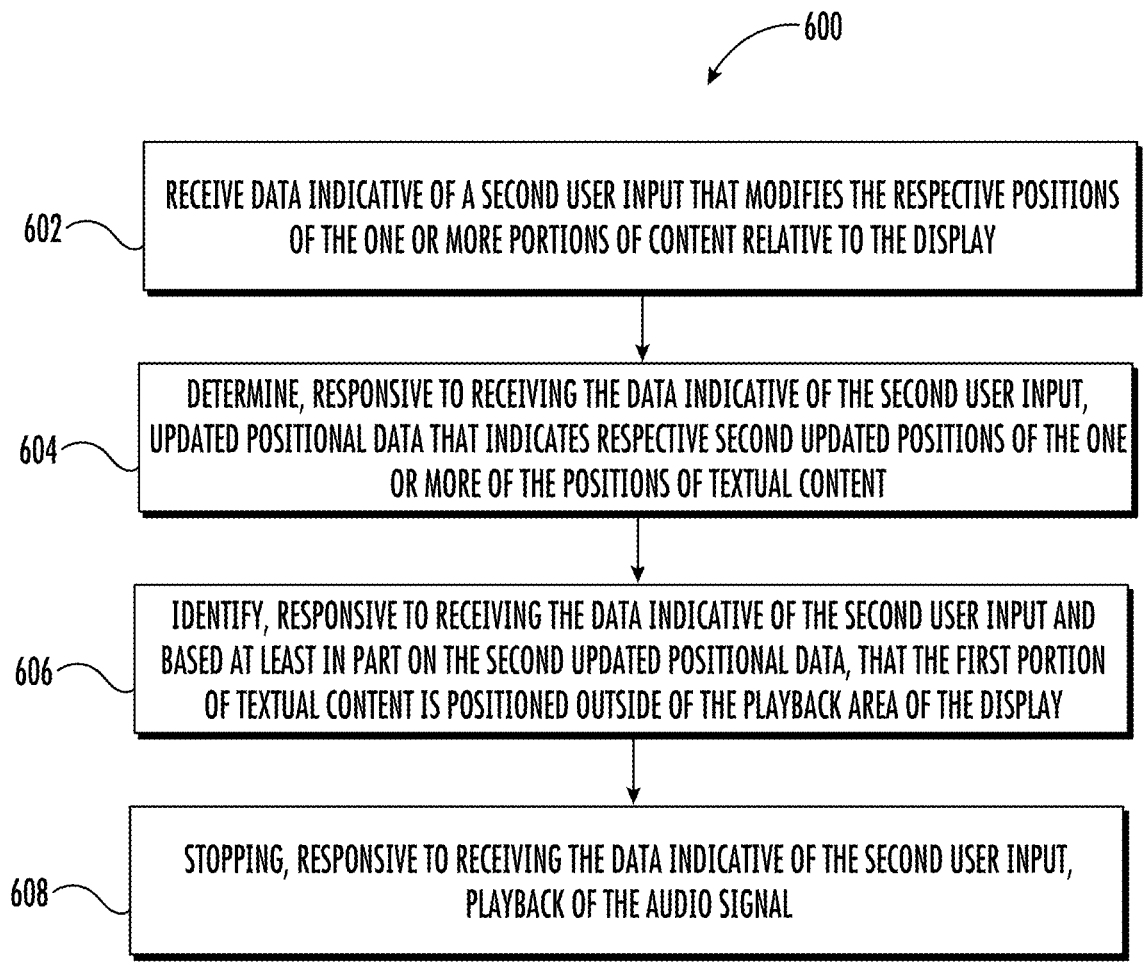
FIG. 6 depicts a flow diagram for an example method of stopping audio playback of displayed textual content in accordance with example embodiments.

FIG. 6 depicts a flow diagram for an example method 600 of stopping audio playback of displayed textual content in accordance with example embodiments. The method 600 can be implemented, for instance, using computing device(s) of FIG. 1. FIG. 6 depicts steps performed in a particular order for purposes of illustration and discussion. Those of ordinary skill in the art, using the disclosures provided herein, will understand that various steps of any of the methods described herein can be omitted, rearranged, performed simultaneously, expanded, and/or modified in various ways without deviating from the scope of the present disclosure.

At 602, the method 600 can include receiving data indicative of a second user input that modifies the respective positions of the one or more portions of content relative to the display. The user input can correspond to a physical user action. As one example, the user can scroll the display up or down using a touch input (e.g., by placing a finger or stylus on a touch sensitive display and sliding up or down). Other examples of user inputs are described in FIG. 5.

At 604, the method 600 can include determining, responsive to receiving the data indicative of the second user input, updated positional data that indicates respective second updated positions of the one or more of the portions of textual content. After one or more portions of textual content have been moved, updated positional data can indicate their new respective positions relative to the screen. As one example, a portion of textual content previously not positioned on the display (e.g., a textual content card associated with a search result) can possess an updated position that is positioned on the display.

At 606, the method 600 can include identifying, responsive to receiving the data indicative of the second user input and based at least in part on the second updated positional data, that the first portion of textual content is positioned outside of the playback area of the display. For example, a first portion of textual content that was included in an audio signal currently being played can, responsive to a user input, be moved out of the playback area while the audio signal is still playing.

At 608, the method 600 can include stopping, responsive to receiving the data indicative of the second user input, playback of the audio signal. If an audio signal is currently being played including a portion of textual content that has been positioned by a user input outside the playback area, the computing device can stop playback of the audio signal. Stoppage of the audio signal can be delayed to allow the user to re-position the first portion of textual content back in the playback area if they desire. As an example, the computing device may pause for 3 seconds before stopping the audio signal including a portion of textual content moved outside the playback area. This allows a user who has submitted an accidental input (e.g., accidentally touching the screen) to fix their error before playback is affected. In some embodiments, this pause can be determined at least in part by a user setting. In other embodiments, this pause can be determined at least in part by machine intelligence (e.g., machine-learned models 120).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform audio playback of displayed textual content, the method comprising:
   obtaining, by a computing system comprising one or more processors, data descriptive of a content item to provide for display, wherein the content item comprises a plurality of portions of textual content;
   determining, by the computing system, positional data that indicates respective positions of one or more of the portions of textual content provided for display;
   receiving, by the computing system, data indicative of a user input that adjusts content provided for display via a navigational scroll of the content item; and
   responsive to receiving the data indicative of the user input, determining, by the computing system, updated positional data that indicates respective updated positions of the one or more of the portions of textual content;
   identifying, by the computing system and based at least in part on the updated positional data, that a first portion of textual content is positioned within a playback area of the display;
   generating, by the computing system, a textual content card based on the first portion of textual content, wherein the textual content card comprises text associated with the first portion of textual content;
   providing, by the computing system, the textual content card for display; and
   providing, by the computing system, automatic playback of an audio signal that includes speech of at least a portion of the first portion of textual content, wherein the speech of at least a portion of the first portion of textual content is determined at least in part using a trained machine learned model.

2. The method of claim 1, wherein generating the textual content card based on the first portion of textual content comprises:
   processing, by the computing system, the first portion of textual content to generate a summary of the first portion of textual content; and
   generating, by the computing system, the textual content card based on the summary of the first portion of textual content, wherein the textual content card comprises the summary.

3. The method of claim 1, wherein the method further comprises:
   receiving, by the computing system, data indicative of a second user input that modifies the respective positions of the one or more portions of content relative to the display;
   responsive to receiving the data indicative of the second user input:
      determining, by the computing system, updated positional data that indicates respective second updated positions of the one or more of the portions of textual content;
      identifying, by the computing system and based at least in part on the second updated positional data, that the first portion of textual content is positioned outside of the playback area of the display; and
      stopping, by the computing system, playback of the audio signal.

4. The method of claim 1, wherein the textual content card further comprises a title associated with the content item.

5. The method of claim 1, wherein a location and size of the playback area is set by a user.

6. The method of claim 1, wherein obtaining, by the computing system, data descriptive of a content item to provide for display further comprises:
   obtaining, by the computing system, unstructured textual content; and
   determining, by the computing system, a plurality of portions of textual content from the unstructured textual content.

7. The method of claim 6, wherein determining, by the computing system, the plurality of portions of textual content from the unstructured textual content is determined based at least in part using a second machine learned model; and
   wherein determining, by the computing system, the plurality of portions of textual content from the unstructured textual content is determined based at least in part based on metadata associated with the unstructured textual content.

8. The method of claim 1, wherein the audio signal includes contextual information associated with the first portion of textual content.

9. The method of claim 1, wherein the audio signal includes a translation from a first language to a second language.

10. The method of claim 1, further comprising:
    generating, by the computing system, a summary of the content item; and
    wherein the textual content card comprises the summary of the content item.

11. A computing system for performing audio playback of displayed textual content, the system comprising:
    one or more processors; and
    one or more non-transitory computer-readable media that collectively store instructions that, when executed by the one or more processors, cause the computing system to perform operations, the operations comprising:
       obtaining data descriptive of a content item to provide for display, wherein the content item comprises a plurality of portions of textual content;
       determining positional data that indicates respective positions of one or more of the portions of textual content provided for display;
       receiving data indicative of a user input that adjusts content provided for display via a navigational scroll of the content item; and
       responsive to receiving the data indicative of the user input, determining updated positional data that indicates respective updated positions of the one or more of the portions of textual content;

identifying, based at least in part on the updated positional data, that a first portion of textual content is positioned within a playback area of the display;

generating a textual content card based on the first portion of textual content, wherein the textual content card comprises the first portion of textual content;

providing the textual content card for display; and providing automatic playback of an audio signal that includes speech of at least a portion of the first portion of textual content, wherein the speech of at least a portion of the first portion of textual content is determined at least in part using a trained machine learned model.

12. The system of claim 11, wherein the content item comprises a search results page generated responsive to a search query; and wherein the plurality of portions of textual content comprise a plurality of search results responsive to the search query.

13. The system of claim 12, wherein the operations further comprise:

summarizing the plurality of search results to generate a summary; and wherein generating the textual content card based on the first portion of textual content comprises generating the textual content card that comprises the summary.

14. The system of claim 11, wherein automatic playback is stopped responsive to identifying that the first portion of textual content is positioned outside of the playback area.

15. The system of claim 11, further comprising applying, by the one or more computing devices, one or more visual effects on the display to one or both of: the first portion of textual content positioned within the playback area or one or more portions of the display other than the playback area.

16. The system of claim 11, wherein the user input comprises a scroll input performed by a user.

17. One or more non-transitory computer-readable media that collectively store instructions that, when executed by one or more computing devices, cause the one or more computing devices to perform operations, the operations comprising:

obtaining data descriptive of a content item to provide for display, wherein the content item comprises a plurality of portions of textual content;

determining positional data that indicates respective positions of one or more of the portions of textual content provided for display;

receiving data indicative of a user input that adjusts content provided for display via a navigational scroll of the content item; and responsive to receiving the data indicative of the user input, determining updated positional data that indicates respective updated positions of the one or more of the portions of textual content;

identifying, based at least in part on the updated positional data, that a first portion of textual content is positioned within a playback area of the display;

generating a textual content card based on the content item, wherein the textual content card comprises a summary of the content item;

providing the textual content card for display; and providing automatic playback of an audio signal that includes speech of at least a portion of the first portion of textual content, wherein the speech of at least a portion of the first portion of textual content is determined at least in part using a trained machine learned model.

18. The one or more non-transitory computer-readable media of claim 17, wherein the audio signal comprises a text-to-speech translation of the one or more portions of textual content.

19. The one or more non-transitory computer-readable media of claim 17, wherein the textual content card further comprises a search result associated with the content item.

20. The one or more non-transitory computer-readable media of claim 17, wherein the textual content card further comprises relevant contextual information of a webpage corresponding to a search result associated with the content item.

* * * * *